United States Patent Office 3,509,915
Patented May 5, 1970

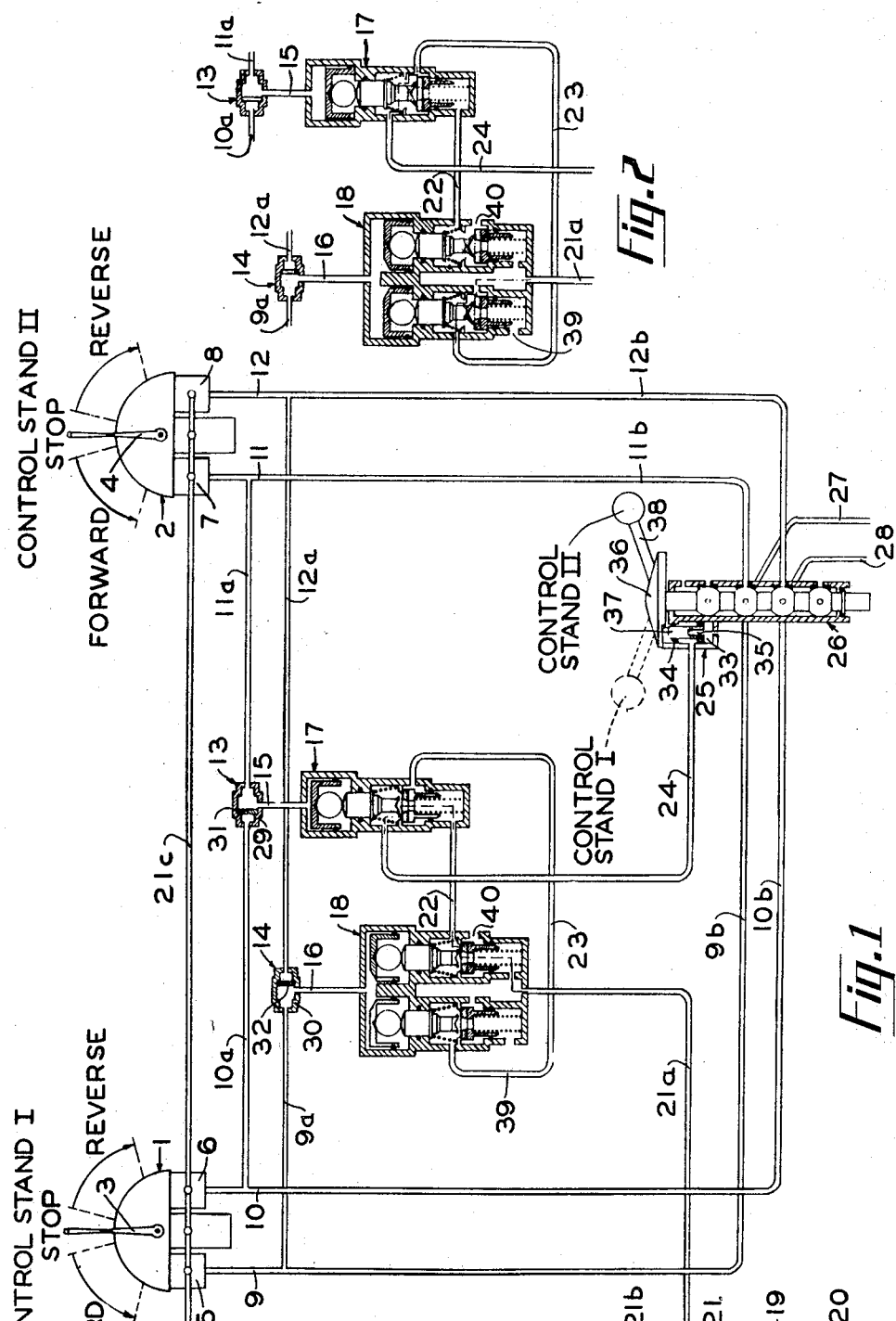

3,509,915
DUAL STATION FLUID SYSTEM CONTROL DEVICE WITH SAFETY INTERLOCK BETWEEN STATIONS
Erwin Janshen and Werner Olbrich, Hannover, Germany, assignors to Westinghouse Bremsen- und Apparatebau G.m.b.H., Hannover, Germany
Filed Aug. 16, 1967, Ser. No. 661,040
Claims priority, application Germany, Sept. 6, 1966,
W 42,370
Int. Cl. F17d 3/00
U.S. Cl. 137—637   2 Claims

ABSTRACT OF THE DISCLOSURE

A valve device for transferring engine control from a first control device to a second control device is locked in position unless the second control device is positioned in the same engine control position as the first control device.

---

It is the object of the present invention to provide in a dual station fluid system control device a safety interlock mechanism which prevents operation of a station control transfer valve unless the engine control device at the station standing by to take control is disposed in the same control position as the control device at the controlling station.

In the present invention this object is achieved by connecting the forward control piping of one control device and the reverse control piping of the other control device, respectively, to the opposing inputs of a first double check valve and connecting the reverse control piping of the one control device and the forward control piping of the other control device, respectively, to the opposing inputs of a second double check valve. A first fluid pressure responsive interlock valve device is connected to the output of the first double check valve, and a second fluid pressure responsive interlock valve device is connected to the output of the second double check valve. The first and second interlock valve devices are series connected with a source of fluid under pressure in such manner as to provide a delivery pressure to energize a piston operated lock mechanism under either of two fluid pressure conditions, the first condition comprising the presence of fluid pressure in the outputs of both double check valves, which first condition occurs when both control valves are positioned in their forward control positions or in their reverse control positions, the second condition comprising a no pressure condition at the outputs of both double check valves, which second condition occurs when both control valves are disposed in their stop positions. The lock mechanism comprises a piston operated latch carried by a station transfer valve, and is normally biased into engagement with a catch carried by the transfer valve operating mechanism to prevent operation of the transfer valve, which piston is operable in response to the delivery pressure supplied by the interlock valve devices to override the bias and disengage the latch to free the transfer valve operating mechanism for effecting transfer of engine control operation to another station.

In the drawing:
FIG. 1 is a diagrammatic representation of a dual station fluid system control device with safety interlock between stations, showing the condition of the safety interlock device when the control devices at both stations are disposed in the stop control position; and
FIG. 2 is a schematic representation of the interlock valve devices of FIG. 1, shown in a condition occurring when both control devices are disposed in the forward control position.

Referring now to FIG. 1 of the drawing, the identical control valves 1 and 2 of the CONTROL STANDS I and II, respectively, are of a conventional type, each having a control handle 3, 4, respectively, each handle selectively positionable in the control ranges FORWARD, STOP and REVERSE. Control valve 1 operates a forward charging valve 5 and a reverse charging valve 6. Similarly, control valve 2 includes a forward charging valve 7 and a reverse charging valve 8. The aforementioned charging valves are connected by means of piping 9 and 9a, 10 and 10a, 11 and 11a, and 12 and 12a with two double return check valves 13 and 14, which in turn are connected by means of piping 15 and 16, respectively, with interlock valve devices 17 and 18, respectively, so that forward valve 5 of control valve 1 and reverse valve 8 of control valve 2 are connected to the opposing inputs of a double check valve 14, and, similarly, forward charging valve 7 of control valve 2 and reverse valve 6 of control valve 1 are connected to the opposing inputs of a double check valve 13.

A supply fluid reservoir 19 is supplied by input pipe 20 and is connected by means of piping 21 and 21a with the interlock valve 18, which in turn is connected by piping 22 and 23 to the interlock valve 17. A pipe 24 leads away from interlock valve 17 to a locking cylinder 25 disposed on the transfer valve 26. The transfer valve 26 communicates the forward and reverse control pipes 9b and 10b or the forward and reverse control pipes 11b and 12b to forward control pipe 27 and reverse control pipe 28, respectively, depending upon the rotative position of transfer valve 26. Control pipes 27 and 28 lead to conventional drive control mechanisms, not show in the drawing. Piping 21b and 21c lead to the control valves 1 and 2.

The double return check valves 13 and 14 are of conventional design and consist of housings 29 and 30, respectively, enclosing valve discs 31 and 32, respectively.

The interlock valve 18 includes openings 39 and 40 which are in connection with the atmosphere.

The locking cylinder 25 is disposed on the transfer valve housing and includes a piston 33 having a piston rod 34 extensible through the cylinder, the piston and rod being biased outwardly of the cylinder by a spring 35.

The transfer valve 26 comprises a multiple ball valve with four paths therethrough. The four ball valves are connected by means of a common shaft having disposed on one end thereof a head member 36 including a pair of catches 37, only one of which is shown in the drawing. A hand lever 38 is provided to effect rotation of the head mechanism and therewith the shaft.

The interlock valve 18 comprises a pair of piston operated supply-release valves disposed in a single housing in side-by-side relation so that in response to pressure supplied via pipe 16, the pistons are simultaneously energized to open passage means to thereby transmit supply of fluid under pressure from pipe 21a via pipe 22 to interlock valve 17 or, in response to the absence of fluid pressure in pipe 16, to transmit supply fluid via pipe 21a to interlock valve 17 via pipe 23.

The interlock valve device 17 is also a piston operated supply-release valve operable in response to piston operating pressure in pipe 15 to transmit therethrough any pressure as may exist in pipe 23 to pipe 24 and the locking cylinder 25 or, in response to the absence of fluid pressure in pipe 15, to transmit fluid under pressure as may exist in pipe 22 to pipe 24 and locking cylinder 25.

In now describing the operation of the above-described apparatus, it will be assumed that the operating handles 3 and 4 of the control valves 1 and 2, respectively, are both positioned in the stop range, as shown in FIG. 1. Under these conditions, the charging valves 5, 6, 7 and 8 are closed so that no pressure is supplied to the double check valves 13 and 14 and, consequently, no pressure is provided to interlock valves 17 and 18 by pipes 15 and 16, respectively. Accordingly, the interlock valve devices 17 and 18 are both disposed in the deactuated position as illustrated in FIG. 1. Accordingly fluid under pressure in the fluid reservoir 19 is provided through pipes 21 and 21a to interlock valve 18, pipe 22 to interlock valve 17 and pipe 24 to the locking cylinder 25 disposed on the transfer valve 26. The pressure buildup in locking cylinder 25 overrides the bias of spring 35 on piston 33 thereby retracting the piston rod 34 within cylinder 25 to disengage the latch end of the piston rod from the catch 37 of the head member of transfer valve 26. The transfer valve 26 may now be moved into the desired one of the two positions illustrated that is, from either of control stand I or control stand II to the other. This is done by manipulation of the hand lever 38. Thereby either the pipes 9b, 10b or the pipes 11b, 12b are connected with the piping 27 and 28 for control of the drive mechanism, not shown. Assuming that the transfer valve control lever 38 is moved to the CONTROL STAND I position, valve device 1 may now be manipulated into its FORWARD or REVERSE range position thereby supplying control pressure to pipe 27 or 28, as desired.

If it is now assumed that the control levers 3 and 4 of control valve devices 1 and 2, respectively, are both located in the FORWARD range position, the charging valves 5 and 7 are open to provide fluid flow therethrough from the fluid reservoir 19. Under these conditions, fluid under pressure from fluid reservoir 19 transmitted through pipe 21, 21b, charging valve 5, pipes 9 and 9a through double check valve 14, and, at the same time, fluid pressure from fluid reservoir 19 is transmitted through pipes 21c, forward charging valve 7 of control valve 2, pipes 11 and 11a to double check valve 13. Thus, fluid pressure is supplied to both interlock valves 17 and 18 by way of pipes 15 and 16, respectively, to energize both interlock valve devices 17 and 18. Under these conditions, interlock valves 17 and 18 assume the respective positions as illustrated in FIG. 2 of the drawing in which fluid under pressure from fluid reservoir 19 is transmitted through pipes 21 and 21a to interlock valve 18, pipe 23 to interlock valve 17, and pipe 24 to actuate the previously described unlocking operation of the locking cylinder 25.

By analysis with the foregoing it will be observed that when both control levers 3 and 4 of control valves 1 and 2 are positioned in the reverse range, fluid pressure is simillarly provided to both interlock valve devices 17 and 18 by way of both double check valves 15 and 16 to effect the previously described unlocking operation of the locking mechanism 25.

From the foregoing, it will be readily observed that so long as the control levers 3 and 4 of the control valves 1 and 2, respectively, are positioned in the same operating range, fluid under pressure from reservoir 19 is passed by way of interlock valve 17 and 18 to unlock the locking mechanism 25, thus permitting transfer of control from either of control valves 1 and 2 to the other, as desired.

As now to be described, when the control levers 3 and 4 of control valves 1 and 2, respectively, are disposed in dissimilar positions, the interlock valve devices 17 and 18 prevent transmission of fluid under pressure from reservoir 19 to the locking mechanism 25 which remains engaged with the catch 37 on transfer valve 26 to prevent transfer of control from one control stand to the other.

If it is now assumed that the control levers 3 and 4 of control valves 1 and 2, respectively, are disposed in their STOP and FORWARD ranges, respectively, or in their REVERSE and FORWARD positions, respectively, or in their REVERSE and STOP positions, respectively, it will be seen by reference to the drawing that under these conditions only double check valve 13 is pressure actuated so that interlock valve 17 assumes the actuated position shown in FIG. 2 while interlock valve 18 assumes the deactuated position as illustrated in FIG. 1. Accordingly, fluid under pressure is supplied from fluid reservoir 19, piping 21 and 21a to interlock valve 18 and pipe 22 to interlock valve 17 where, because of the actuated condition of interlock valve 17 supply pressure is bottled up therein. At the same time, if the locking mechanism 25 is in the unlocked position by pressure supplied thereto by a previous operation of the control valves 1 and 2, such pressure is exhausted from the cylinder 25, via pipe 24, interlock valve 17, pipe 23 to the interlock valve 18 and exhaust port 39 so that the piston 33 operates under the bias of spring 36 to extend piston rod 34 into locking engagement with catch 37 on the transfer valve 26, thus preventing operation of the transfer valve 26.

If it is now assumed that control levers 3 and 4 of control valves 1 and 2, respectively, are disposed in their FORWARD and STOP positions, respectively, or their FORWARD and REVERSE positions, respectively, or in their STOP and REVERSE positions, respectively, it will be seen by reference to the drawing that under these conditions fluid under pressure is supplied only to double check valve 14, thus actuating interlock valve 18 in the manner disclosed in FIG. 2 of the drawing, while interlock valve 17 remains deactuated in the manner disclosed in FIG. 1 of the drawing. Under these conditions, fluid under pressure is supplied from fluid reservoir 19 to pipes 21 and 21a to interlock valve 18, pipe 23 to interlock valve 17 where, because of the deactuated condition of interlock valve 17, such pressure is bottled up therein. At the same time, if the locking mechanism 25 is disposed in the unlocking condition because of pressure therein resulting from a previous operating condition of the control valves 1 and 2, such pressure is relieved, thereby effecting relatching of the piston rod 34 in the catch 37 on transfer valve 26, by way of pipe 24, interlock valve 17, pipe 22 and interlock valve 18 to atmosphere through exhaust port 40.

From the foregoing description it will be seen that the interlock valves 17 and 18 operate to effect fluid pressure unlocking of the locking cylinder 25 on transfer valve 26 only when the control levers 3 and 4 of the control valves 1 and 2, respectively, are disposed in corresponding positions.

It will be apparent from the foregoing description that the invention may be readily applied as a safety interlock mechanism for more than two control stations.

Having now described the invention, what we claim as new and desire to secure by Letters Patent is:

1. A multi-station fluid system control device with safety interlock between stations, comprising:
   (a) a fluid pressure control valve device having a forward position, a reverse position and a stop position disposed at each of a plurality of control stations;
   (b) control pipe means associated with each control valve device and subject to pressurization by a fluid pressure source in accordance with the control position of the corresponding control valve device;
   (c) a control station transfer valve interconnecting said control pipe means and operable to selectively communicate any one of said control pipe means with a main control pipe means;
   (d) locking means operable in response to a no pressure condition to prevent selective operation of said transfer valve and operable in response to a pressure condition to unlock said transfer valve;
   (e) safety interlock means communicating with each fluid control valve means and including valve means operable to effect communication of fluid pressure to said locking means only when all of said control valves are disposed in the same control position;
   (f) said valve means included in said safety interlock means comprise first and second interlock valve means interconnected to communicate fluid pressure with said locking means only when control fluid pressure is supplied to the control inlet means of both or neither of said first and second interlock valve means;

(g) said control pipe means for each control valve device and said main control pipe means each comprising forward and reverse control pipe means;

(h) a first valve means communicating said forward control pipe means of one control device and the reverse control pipe means of another control device with said control inlet means of said first interlock valve means; and (i) second valve means communicating said reverse control pipe means of said one control valve device and said forward control pipe means of said another control valve device with said control inlet of said second interlock valve means.

2. The multi-station fluid system control device with safety interlock between stations, as recited in claim 1, in which each of said first and second valve means comprise double check valve means.

References Cited

UNITED STATES PATENTS 2,457,610  12/1948  Stevens _____ 137—637.1 X
3,340,898  9/1967  Strauss _____ 137—627.5

CLARENCE R. GORDON, Primary Examiner